(12) United States Patent
Spooner (10) Patent No.: US 12,092,152 B1
(45) Date of Patent: Sep. 17, 2024

(54) MOUNTING SYSTEM SUCH AS FOR VEHICLE LIGHTS

(71) Applicant: Dennis Ty Spooner, Willows, CA (US)

(72) Inventor: Dennis Ty Spooner, Willows, CA (US)

(*) Notice: Subject to any disclaimer, the term of this patent is extended or adjusted under 35 U.S.C. 154(b) by 604 days.

(21) Appl. No.: 17/388,886

(22) Filed: Jul. 29, 2021

Related U.S. Application Data (60) Provisional application No. 63/060,970, filed on Aug. 4, 2020.

(51) Int. Cl.
| | |
|---|---|
| *F16C 11/10* | (2006.01) |
| *F16M 11/20* | (2006.01) |
| *F16M 13/02* | (2006.01) |
| *B60Q 1/18* | (2006.01) |
| *B60Q 1/24* | (2006.01) |

(52) U.S. Cl.
CPC ......... *F16C 11/10* (2013.01); *F16M 11/2014* (2013.01); *F16M 13/02* (2013.01); *B60Q 1/18* (2013.01); *B60Q 1/245* (2013.01); *Y10T 403/32327* (2015.01); *Y10T 403/32361* (2015.01); *Y10T 403/32418* (2015.01)

(58) Field of Classification Search
CPC ................ F16C 11/10; F16C 11/103; Y10T 403/32213; Y10T 403/32254; Y10T 403/32262; Y10T 403/32327; Y10T 403/32336; Y10T 403/32352; Y10T 403/32361; Y10T 403/32377; Y10T 403/32418; Y10T 403/599; B60Q 1/0483; B60Q 1/18; B60Q 1/245; B60Q 1/2611; F16M 11/08; F16M 11/2014; F16M 13/02; F16M 13/022; F16M 2200/024
See application file for complete search history.

(56) References Cited

U.S. PATENT DOCUMENTS

| | | | | |
|---|---|---|---|---|
| 3,734,439 A | * | 5/1973 | Wintz | A47G 23/0241 248/230.8 |
| 5,490,046 A | * | 2/1996 | Gohl | B60Q 1/076 362/418 |
| 5,522,527 A | * | 6/1996 | Tsai | B62J 29/00 224/558 |
| 5,661,942 A | * | 9/1997 | Palmer | E04H 15/48 135/156 |

(Continued)

FOREIGN PATENT DOCUMENTS

DE 102007056280 B3 * 7/2009 ........... B60Q 1/0483

*Primary Examiner* — Josh Skroupa
*Assistant Examiner* — Kevin J Baynes
(74) *Attorney, Agent, or Firm* — Heisler & Associates (57) ABSTRACT

Lights or other accessories can be mounted through a mount hole of an adapter plate which is pivotably supported upon a base. The base is attachable to an underlying structure, such as a motor vehicle, through bores passing through lateral wings thereof, or through bores in an angled flange thereof. The base includes a cylindrical body with an upper face. A central recess extends down into a center of the cylindrical body, located at a center of the upper face. The adapter plate includes a cylindrical extension which fits within the cylindrical recess. A series of holes surround the central recess in the upper face of the base. A set pin of the adapter plate is biased toward extending down from the adapter plate to reside within one of the holes in the upper face, to hold the adapter plate in one of multiple rotationally spaced positions.

18 Claims, 5 Drawing Sheets

(56) References Cited

U.S. PATENT DOCUMENTS

| | | | | |
|---|---|---|---|---|
| 5,713,633 | A * | 2/1998 | Lu | B60N 2/847 |
| | | | | 403/93 |
| 6,332,699 | B1 * | 12/2001 | Lee | B60Q 1/12 |
| | | | | 362/544 |
| 6,428,197 | B1 * | 8/2002 | Downing | F21L 14/04 |
| | | | | 362/426 |
| 7,648,253 | B2 * | 1/2010 | Katz | F21V 21/30 |
| | | | | 362/418 |
| 7,862,197 | B2 * | 1/2011 | Gebhard | F21V 21/30 |
| | | | | 362/398 |
| 7,963,683 | B2 * | 6/2011 | Czajkowski | F21S 10/06 |
| | | | | 362/284 |
| 8,613,379 | B2 * | 12/2013 | Lee | B62J 50/225 |
| | | | | 224/558 |
| 9,315,144 | B2 * | 4/2016 | Li | B60Q 1/2615 |
| 9,539,952 | B2 * | 1/2017 | Gebhard | F21V 29/70 |
| 9,839,306 | B2 * | 12/2017 | Atkins | F16M 11/10 |

\* cited by examiner

MOUNTING SYSTEM SUCH AS FOR VEHICLE LIGHTS

CROSS-REFERENCE TO RELATED APPLICATIONS

This application claims benefit under Title 35, United States Code § 119(e) of U.S. Provisional Application No. 63/060,970 filed on Aug. 4, 2020.

FIELD OF THE INVENTION

The following invention relates to rotatable mounting systems which include a base which can be affixed to a structure, such as a vehicle, and a rotating structure which rotates relative to the base and can support items, such as lights. More particularly, this invention relates to mounting systems which include a rotating structure which can rotate relative to a base, and which can be stopped and held fixed in different discrete positions in a simple and repeatable fashion.

BACKGROUND OF THE INVENTION

Lights, and especially spotlights are often mounted to a vehicle just forward of a windshield at a left and/or right side thereof, where a driver or other occupant can manage the spotlight to shine it at objects of interest. Mounting the spotlight directly to the vehicle allows for the weight of the spotlight to be carried by the vehicle and for precise positioning of the spotlight, and holding the spotlight still. Also, with the spotlight mounted to the vehicle, an individual does not have one hand required to hold the light, so hands remain free for other activities.

Spotlights often need to be pointed in different directions relative to the vehicle. Such pointing of the spotlight includes changing a horizontal direction in which the light is pointing, such as straight ahead, straight to the side, partially to the rear, or some combination of horizontal directions. Furthermore, typically it is desirable that the spotlight can be tilted more upwardly or more downwardly. Many spotlights include a bracket which facilitates tilting. However, typically spotlights do not include horizontal rotational adjustment facilitation.

A wide variety of mounting systems are known in the prior art for mounting the spotlight or other light to a vehicle. Some such mounts have a fixed orientation. Other such mounts rely on a friction fitting and the light can be turned horizontally by applying torque to the spotlight or other light with a greater magnitude than the friction in the fitting. Such friction fittings are not entirely desirable in that vibration of the vehicle can often overcome the friction in such fittings, or the friction needs to be so high to keep it steady under vehicle vibration that it takes significant force to turn the spotlight. Furthermore, typically static friction is greater than dynamic friction. Thus, it takes initially high amounts of torque to overcome static friction to be turned horizontally by applying torque to the spotlight or other light with a greater magnitude than the friction in the fitting. Once this static friction is overcome, the lesser dynamic friction often causes the spotlight or other light to rotate a greater amount than desired. Once torque is diminished to keep the light from being turned too far, it then comes to rest and won't turn anymore until the static friction is again overcome, repeating the positioning problem. Accordingly, a need exists for improved horizontal adjustability within a mounting system such as that utilized for mounting lights to vehicles.

Different vehicles present different surfaces to which lights or similar objects can be mounted. On some vehicles a somewhat horizontal surface is presented, benefiting from one type of mounting system. On other vehicles, a more vertical surface is presented, calling for a mounting system having a different configuration. Beneficially, a mounting system would come in different basic configurations including a basic configuration for a more horizontal surface and a basic configuration for a more vertical surface, so that a secure mounting system can be provided of one or the other variety, and without having unnecessary additional moving parts within the mounting system.

SUMMARY OF THE INVENTION

With this invention, a mounting system is provided having a general two-part configuration, which facilitates secure mounting of a spotlight or similar object to a vehicle or similar underlying platform. The mounting system facilitates rotation horizontally about a vertical (or at least more vertical than horizontal) central axis. Any tilt of the light or other object would be provided within an intermediate structure, typically provided along with the spotlight or other item, or provided separately from the mounting system of this invention, to facilitate tilting of the light or other object relative to the vehicle or other underlying support.

The mounting system of this invention is described in a first embodiment where it is configured for mounting to a surface of the vehicle or other underlying support which is closer to horizontal than to a vertical. The mounting system includes two parts, a base and an adapter plate. The base is affixed to a surface of the vehicle or other underlying support. The adapter plate is affixed to the spotlight or other item. The adapter plate and base are configured so that they are held together, but the adapter plate can rotate relative to the base, to a series of discrete positions where it can be locked in place.

In a preferred embodiment, the base includes a generally flat undersurface which can abut against a generally horizontal surface of a vehicle or other underlying support. This undersurface is preferably generally planar in form. As an option, a resilient intermediate pad could be interposed between the undersurface and the vehicle or other support, such a pad providing vibration reduction, avoiding damage to surfaces of the vehicle or other structure, and perhaps to some extent leveling the undersurface to a more perfectly horizontal form, if the intermediate pad has an irregular thickness. In one embodiment, different intermediate pads of different particular geometries can be provided on a vehicle-model-by-vehicle-model basis, so that the mounting system does not need to be modified, other than this underlying pad, and still provide a horizontal or near horizontal orientation for the undersurface of the base.

A pair of wings extend laterally from opposite ends of the base. These wings each include bores passing vertically downwardly therethrough. Holes in the vehicle or other underlying support are provided at a spacing matching a spacing between these bores in the wings, and with a size which allows a fastener to pass through these bores in the wings and then thread into the holes in the vehicle or other underlying support, either with direct threading, or with an associated nut. While bolts/nuts, screws or other threaded fasteners are contemplated for passing through these bores in the wings, it is conceivable that other forms of fasteners can be utilized, including rivets, pins, etc., for either permanent or removable mounting of the base to a vehicle or other underlying support. The bores are shown with a tapering upper surface, such as to accommodate a tapering head of a bolt, screw, or other fastener, and to provide a relatively flush finish, and potentially somewhat recessed finish for an upper portion of such a fastener.

Between the wings, the base preferably includes a cylindrical body which extends upwardly somewhat to a greater elevation than the wings. This cylindrical body extends up to an upper face. The upper face is generally planar with a perimeter rim, and with a perimeter groove inboard of this perimeter rim which extends vertically downwardly somewhat into the upper face. Inboard of this perimeter groove, the upper face has an elevation which preferably matches that of the rim, and includes a series of holes extending vertically down into the upper face. A central portion of the upper face includes a central recess extending cylindrically down into the upper face.

The holes in the upper face are preferably of a similar size and most preferably are not threaded. A set pin fits into one of these holes, and keeps the adapter plate from rotating relative to the base. This set pin is described in detail below, and can either be threaded into one of the holes by providing female threads within the holes, or (and typically) not provided with any threads, with the set pin held to the adapter plate, and spring loaded so it can snap down into one of the holes, and tends to remain within one of the holes, unless spring forces or other biasing forces are overcome by lifting of the set pin out of one of the holes, before allowing rotation of the adapter plate relative to the base and snapping of the set pin into one of the other holes. In the embodiment depicted, eight such holes are provided in the upper face, and these holes are provided equal distance from each other in a circle around the central recess. Other numbers of holes or spacings between holes could alternatively be provided.

The central recess receives and maintains alignment with a cylindrical extension extending from a lower surface of the adapter plate. The adapter plate can rotate with this cylindrical extension supported within this cylindrical central recess in the upper face of this elongate body. Preferably a floor of this central recess has a bore passing downwardly therein, which is a blind bore which is threaded with female threads. An axle pin can pass down through a central bore in the adapter plate and then into this bore in the floor of the central recess of the upper face, so that when the axle bolt is passed through the adapter plate and threaded bore in the floor of the central recess, this axle acts as an axle about which the adapter plate can still rotate. If desired, lubricants, bearings, or other elements can be provided to facilitate rotation between the adapter plate and the base.

The adapter plate is a rigid structure preferably formed as a unitary mass separate from the base. This adapter plate includes a main body with an ear extending laterally from the main body. A mount hole in the ear passes vertically therethrough and receives a mounting fastener which allows the lower portion of a spotlight or other light (or other item) to be mounted to this mount hole in the ear. The ear may generally point in a direction that the spotlight or other item will point in one embodiment. A center of the main body has the central bore passing therethrough, so that the adapter plate rotates about this central bore.

A set hole passes through the adapter plate and is located adjacent to the central bore and on a side of the central bore preferably opposite the mount hole and opposite the ear. The set hole receives a set pin therein which can align and hold the set hole with one of the holes in the base. In a typical embodiment, the set hole is threaded and a spring loaded pin is threaded into this set hole. The spring loaded pin has a central pin which can translate vertically within a housing which has male threads thereon which thread with female threads in this set hole. This set pin can thus be threaded into the set hole, and the central pin thereof can still translate vertically up-and-down relative to the housing to extend into and out of one of the holes in the upper face of the cylindrical body. A spring between the housing and the central pin biases the set pin in a downward position. A handle on an upper portion of the set pin allows the set pin to be grasped and elevated, by applying force contrary to the spring or other biasing element, so that the pin can be lifted out of one of the holes, and the entire adapter plate and associated light or other item can be rotated to a desired position, and then the set pin can be released to snap into one of the other holes in the upper face of the cylindrical body.

The cylindrical extension extends downwardly from the adapter plate and has a cylindrical form with a diameter similar to that of the central recess in the upper face of the cylindrical body of the base. The cylindrical extension has the central bore passing therethrough, so that the axle bolt or other axle structure can pass entirely down through the cylindrical extension and into the threaded bore in the floor of the central recess of the upper face. In this embodiment, the undersurface of the base does not have this threaded bore extending therethrough. However, this threaded bore could pass through the undersurface, if desired.

Furthermore, the threaded bore could be non-threaded, and a nut could be provided beneath the undersurface for attachment to an axle bolt. As a further alternative, the axle bolt could extend upwardly through such a bore so that the head of the bolt would reside beneath the undersurface, and then a nut could be used for attachment of the adapter plate to the base (or the cylindrical extension or other upper portion of the adapter place could be threaded). However, such a configuration would require sufficient space to be available to access this undersurface near the bore in the floor of the central recess. As one option, a relief hole could be provided in the undersurface adjacent to this bore in the central recess to accommodate a head of an axle bolt or other axle/fastener. Such a relief hole could conceivably be faceted, such as with a hexagonal form, if desired, to prevent rotation of the head of such a bolt. Such a relief hole could similarly hold a nut in position without rotation. In the typical embodiment depicted herein, the bore in the floor of the center recess is merely threaded itself, and does not extend through the undersurface.

Drawings associated herewith show the various features of this invention according to one embodiment. Photographs included herein show an alternative embodiment where the base has an angle bracket associated therewith, formed to facilitate mounting to a vertical surface or at least a surface that is closer to vertical than to horizontal. As with the embodiment described above, a pad or other intermediate adapter surface could be provided adjacent to the base to adjust an angle thereof somewhat, so that a cylindrical body of such an angled base could be maintained at a horizontal or close to horizontal orientation. This alternative angled base has a flange which is oriented generally within a vertical plane, and a cylindrical body similar to the cylindrical body of the embodiment described above which is generally perpendicular to this flange. Two bores pass through this flange which allow for fasteners to secure the flange and the overall base to a vehicle or other underlying support.

OBJECTS OF THE INVENTION

Accordingly, a primary object of the present invention is to provide a mounting system which can mount a light, such as a spotlight, to an underlying structure, such as a vehicle.

Another object of the present invention is to provide a mounting system for a light which allows the light to be pivoted about a substantially vertical axis, so that the light can be pointed in a variety of different directions.

Another object of the present invention is to provide a mounting system for a light which allows the light to be pivoted to point in different directions, and to be held in a variety of different positions.

Another object of the present invention is to provide a mounting system with an adapter plate rotatable relative to a base, and with a set pin which can hold the adapter plate in a variety of different positions relative to the base, and with an item such as a light mounted to the adapter plate.

Another object of the present invention is to provide a mounting system which has a base and a rotating portion, which rotating portion exhibits pure rotation as a single degree of freedom for the mounting system.

Another object of the present invention is to provide a mounting system which is of robust durable construction, able to withstand impacts without incurring damage and without portions thereof rotating or otherwise becoming displaced.

Another object of the present invention is to provide a mounting system with a rotating structure rotatably supported by a base, and with the rotating structure easy to rotate into a variety of different positions and which rotating structure can be held in a variety of different positions.

Another object of the present invention is to provide a mounting system for mounting at least one light upon a vehicle and with the light rotatable to point in different directions.

Another object of the present invention is to provide a system and method for mounting a light upon a vehicle and facilitating rotation of the light relative to the vehicle.

Other further objects of the present invention will become apparent from a careful reading of the included drawing figures, the claims and detailed description of the invention.

BRIEF DESCRIPTION OF THE DRAWINGS

FIG. 6 depicts an angle bracket base particularly for use on the right side of a vehicle.

DESCRIPTION OF THE PREFERRED EMBODIMENT

Figure 1:
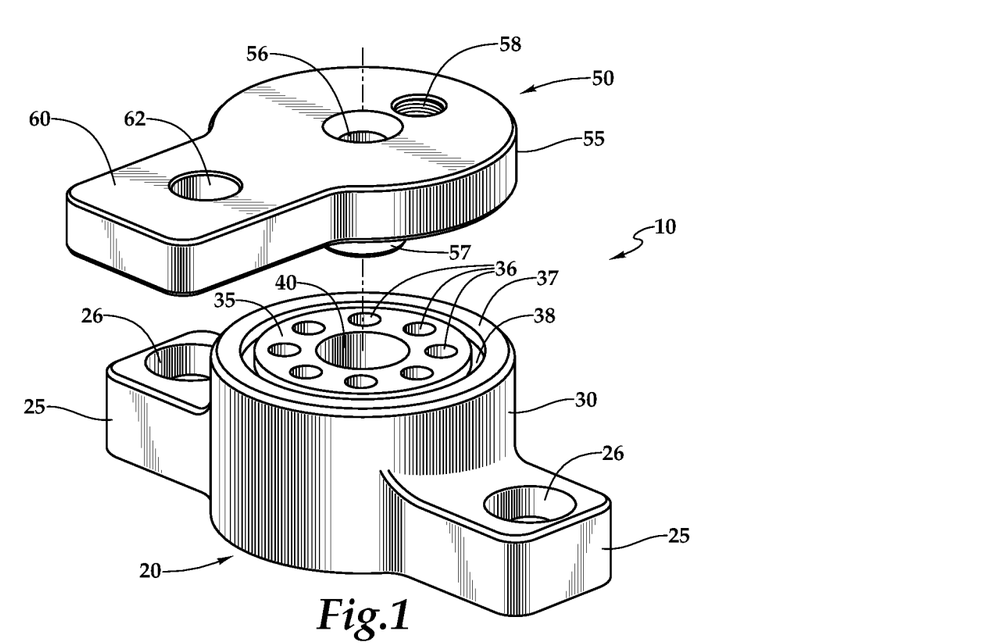
FIG. 1 is a perspective exploded view of two main portions of the mounting system of this invention, including a base and an adapter plate, the adapter plate rotatable relative to the base and held to the base typically by an axle bolt aligned with an axis of rotation of the adapter plate relative to the base.
Figure 2:
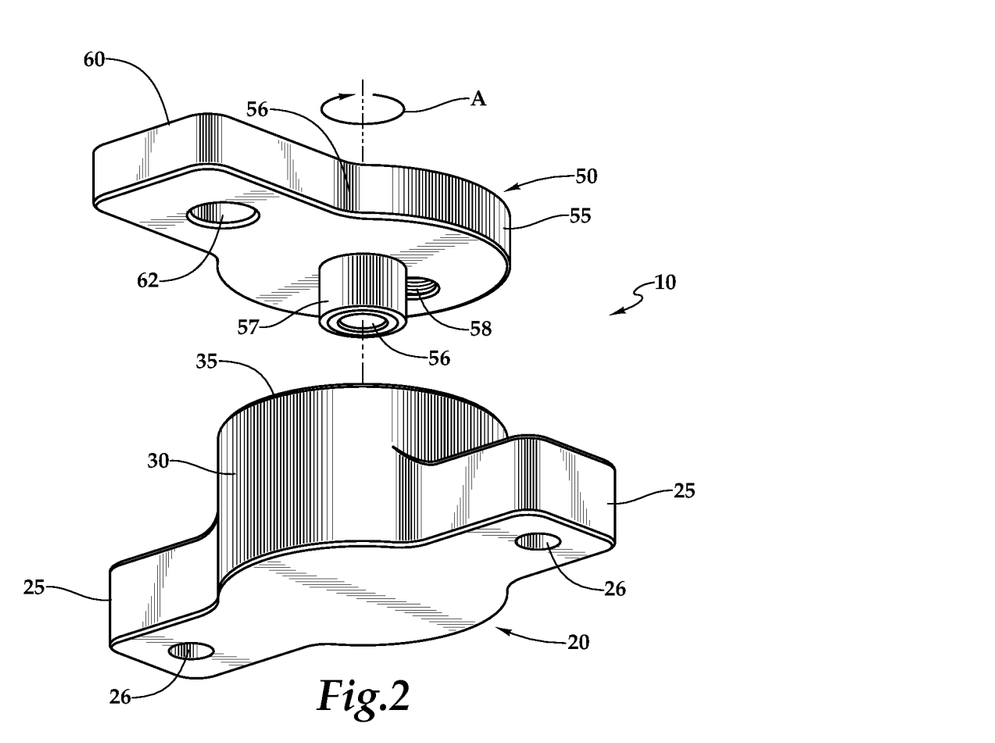
FIG. 2 is a perspective exploded view similar to that which is shown in FIG. 1, but from a perspective below the adapter plate and the base, and with an axis of rotation illustrated thereon.
Figure 18:
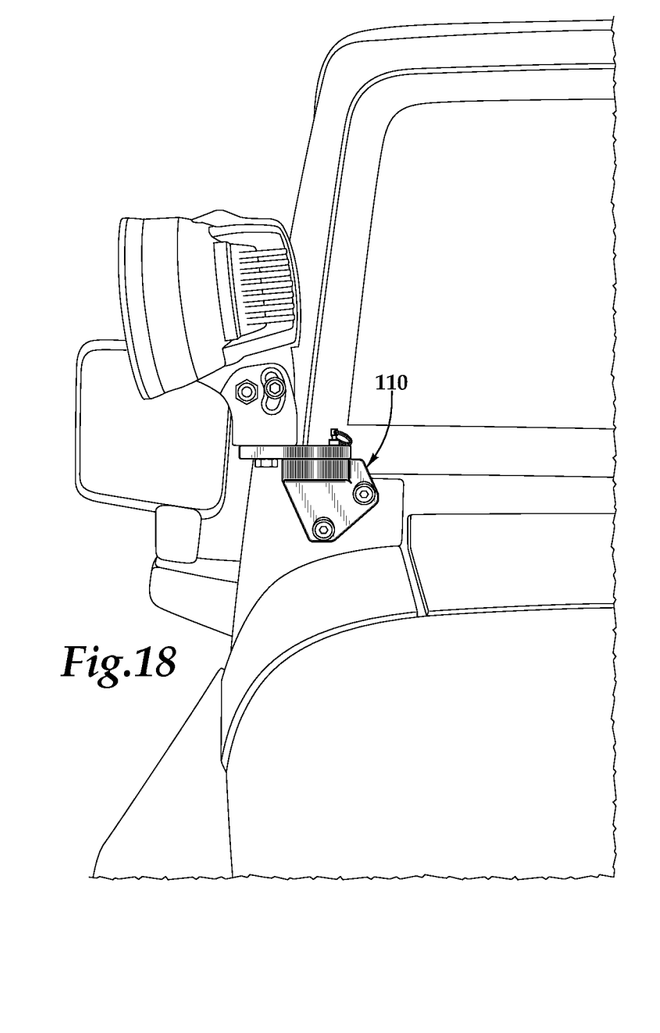
FIG. 18 is a perspective view of the mounting system with an angle bracket base holding a light and mounted upon a motor vehicle.
Figure 19:
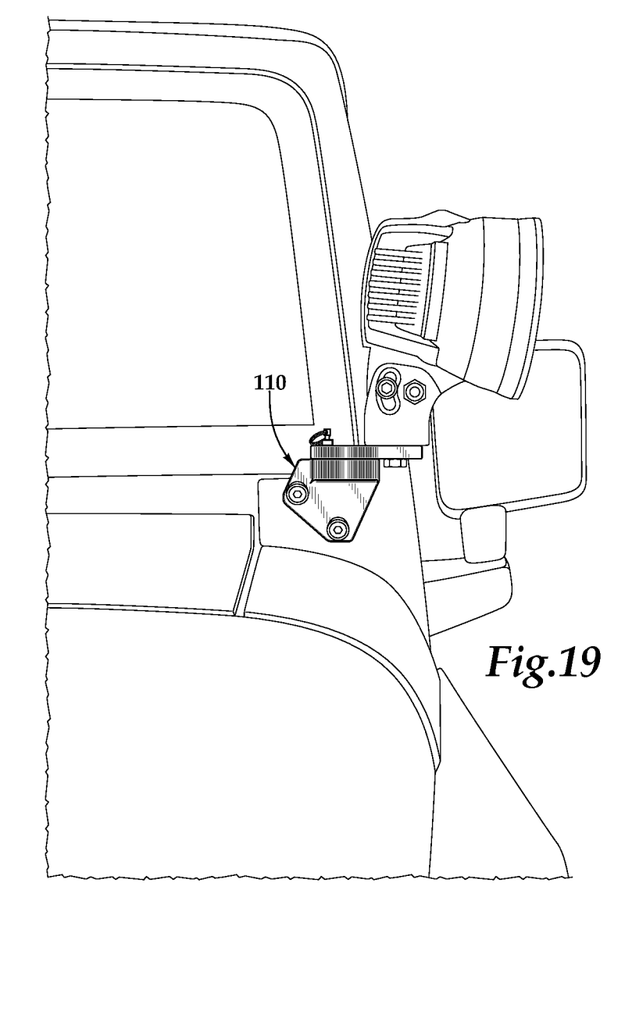
FIG. 19 is a perspective view of the mounting system with an angle bracket base holding a light and mounted upon a vehicle.

Referring to the drawings, wherein like reference numerals represent like parts throughout the various drawing figures, reference numeral 10 is directed to a mounting system (see FIGS. 1 and 2 as well as FIGS. 18 and 19). The mounting system 10 includes a base 20 which can be affixed to an underlying structure, such as a motor vehicle. An adapter plate 50 is rotatably supported by the base 20. The adapter plate 50 can support an object thereon, such as a light, in a rotatable fashion through rotation between the adapter plate 50 and the base 20 of the mounting system 10.

In essence, and with particular reference to FIGS. 1 and 2, basic details of the mounting system 10 are described, according to a first example. In this first example embodiment, the base 20 is configured for mounting onto a structure which is close to horizontal, such as a hood of a motor vehicle such as an off-roading truck or sport utility vehicle. The base 20 includes a pair of wings 25 which extends laterally from a cylindrical body 30. The cylindrical body 30 extends up to a planar circular upper face 35. A central recess 40 extends down into the upper face 35 at a central portion of the cylindrical body 30. Holes 36 surround the central recess 40 and extend down into the upper face 35.

The adapter plate 50 has a main body 55 with an ear 60 extending laterally from one portion thereof. A cylindrical extension 57 extends down from the main body 55 of the adapter plate 50. The cylindrical extension 57 is sized to fit within the cylindrical recess 40 of the base 20 to keep the adapter plate 50 for moving relative to the base 20, other than through rotation about a vertical central axis aligned with the center of the cylindrical extension 57 and the central recess 40 of the base 20. A set hole 58 in the main body 55 of the adapter plate 50 supports a set pin 70 therein. The set pin 70 has a central pin 90 which is spring biased to extend down into one of the holes 36 in the upper face 35 of the cylindrical body 30 of the base 20. A knob handle 100 or ring handle 94 on the set pin 70 allow forces to be applied to the set pin 70 to move it out of one of the holes 36, so that the adapter plate 50 can be rotated relative to the base 20 to a desired orientation, before the set pin 70 is allowed to extend back down into a different one of the holes 36 in the upper face 35 of the cylindrical body 30 of the base 20.

More specifically, and with continuing reference to FIGS. 1 and 2, basic details of the base 20 are described, according to this first example. The base 20 is a monolithic structure formed of rigid material. One typical material would be aluminum or other metal, with the base 20 machines to have its final form. In another embodiment, the base 20 could be cast from metal or other materials, or formed by injection molding or other processes.

The base 20 has a central portion defined by a cylindrical body 30. The cylindrical body 30 has a cylindrical form with a central axis extending substantially vertically, and with this cylindrical body 30 typically having a height less than a diameter thereof. In one embodiment, this height is approximately half of a diameter thereof.

A pair of wings 25 extend laterally from sides of the cylindrical body 30, with the two wings 25 opposite each other. Preferably, an underside of the base 20 is defined by portions of the wings 25 and the cylindrical body 30, which underside is typically entirely planar. The wings 25 have bores 26 passing therethrough. Fasteners can pass through these bores 26 and then into holes formed in an underlying structure to which the base 20 is to be mounted. Typically, fasteners such as a bolt and nut pair would be utilized for such attachment. In other embodiments, a screw could be utilized, or some form of specialty bolt could be utilized with an anchor structure to expand beneath thin structures, such as sheet metal panels of a motor vehicle body.

An upper portion of the cylindrical body 30 is defined by an upper face 35. This upper face 35 is preferably circular in form and planar, with a substantially horizontal orientation. A center of the upper face 35 is defined by the central recess 40. Preferably, the central recess 40 extends down into the cylindrical body 30 some distance, but not entirely therethrough. In one embodiment, this central recess 40 extends halfway from the upper face 35 toward an underside of the base 20. A floor of the central recess 40 can include a threaded bore therein which can receive a tip of an axle bolt 45 (FIG. 16), the axle bolt 45 used to hold the adapter plate 50 upon the base 20 with the cylindrical extension 57 of the adapter plate 50 within the central recess 40.

The upper face 35 also includes holes 36 outboard of the central recess 40, with each hole 36 extending vertically down into the upper face 35 of the cylindrical body 30. These holes 36 of common size are preferably equally spaced from each other and surround the central recess 40. In some embodiments, the holes 36 can be concentrated on one side of the central recess 40 along an arcuate line.

A perimeter groove 38 preferably is oriented inboard of a rim 37 and outboard of the holes 36. This perimeter groove is preferably circular in form. If desired, structures on the adapter plate 50 can be provided which extend down into the perimeter groove 38 to help keep the adapter plate 50 aligned with the base 20 when the adapter plate 50 is rotating relative to the base 20. The perimeter groove 38 can alternatively, or in addition, carry bearing structures, such as low friction bearing structures which can friction fit into the perimeter groove 38 or otherwise be attached within the perimeter groove and at least partially carry vertical loads between adapter plate 50 and the base 20.

In an alternative embodiment depicted in FIGS. 6-12, the base 20 can be replaced with an angle bracket base 120. This angle bracket base 120 can be provided in left side and right side configurations with the left side configured to attach to the left side of a cab of a motor vehicle, and the right side configured attached to a right side of a cab of a motor vehicle. In this alternative angle bracket base 120 embodiment, a cylindrical body 130 is provided which is generally shorter than the cylindrical body 30 of the base 20 of the first example embodiment.

Figures 12, 13, 14, 15, 16, 17:
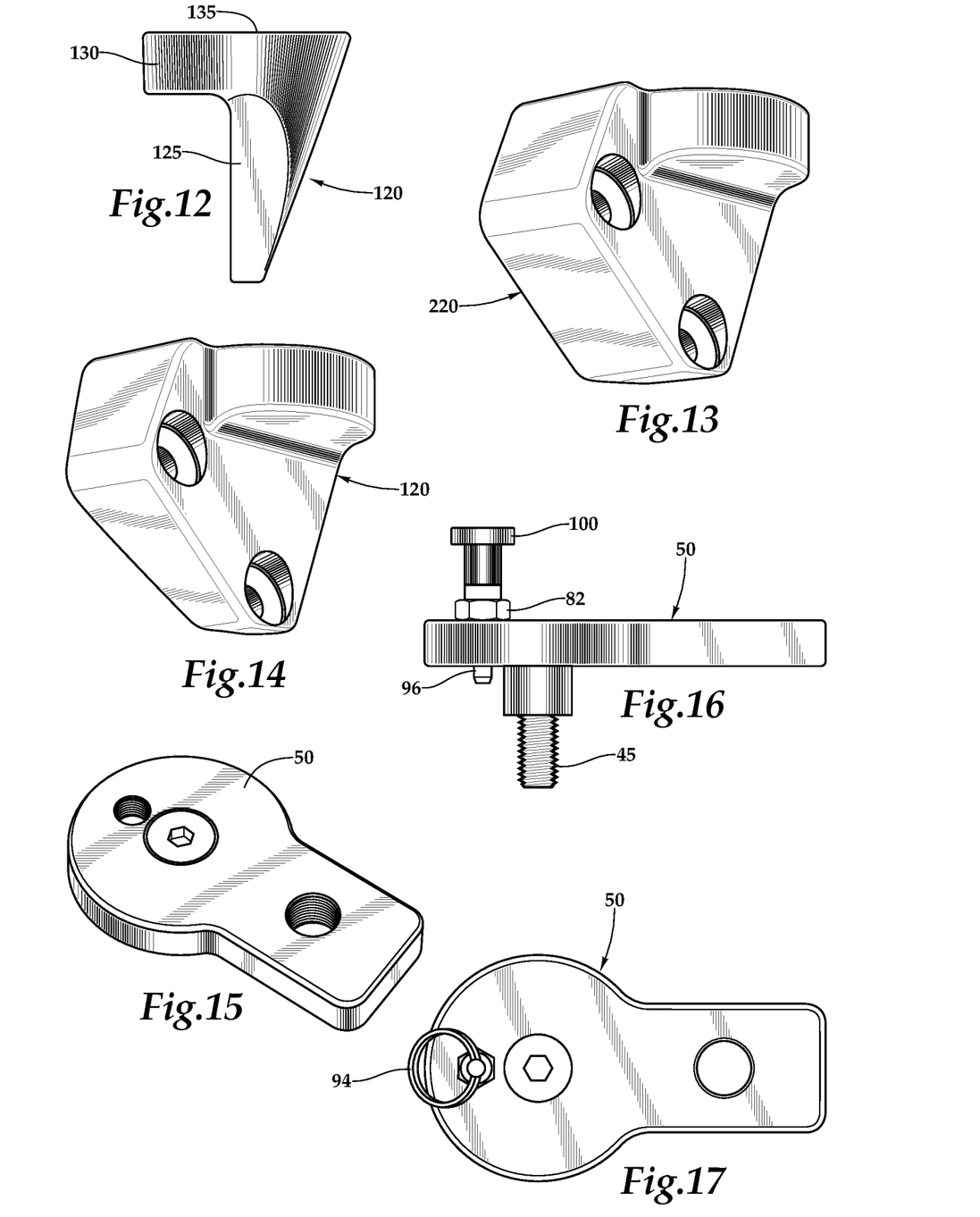
FIG. 12 is a left side elevation view of the angle bracket base of FIGS. 7, 8 and 11.
FIG. 13 is a perspective view of an alternative embodiment left side angle bracket base having a thicker flange than the embodiment depicted in FIGS. 7, 8 and 11.
FIG. 14 is a perspective view from a right front side of the left side angle bracket base depicted in FIGS. 7, 8 and 11.
FIG. 15 is a perspective view of a combination of the adapter plate of FIGS. 1-5 and an angle bracket base, illustrating how the same adapter plate of FIGS. 1-5 can also be supported upon the angle bracket base such as that shown in FIG. 6-12.
FIG. 16 is a side elevation view of the adapter plate of FIGS. 1-5 further including a set pin with a knob handle and with a tip of a central pin shown extending below the set hole in the main body of the adapter plate, and also showing a lower portion of an axle bolt extending out of the central bore in the cylindrical extension of the adapter plate.
FIG. 17 is a top plan view of the adapter plate of FIG. 16, but showing the set pin with ring handle affixed within the threaded set hole of the main body of the adapter plate.

In place of the wings 25, a flange 125 extends downward from the cylindrical body 130, preferably substantially perpendicular to the upper face 135, but angled slightly, especially with an angle matching a sweep angle of forward portions of a cab of a vehicle to which the angle bracket base 120 is to be attached. At least two bores 126 pass through this flange 125 to allow for fasteners to pass through these bores 126 and to fix the flange to a portion of the vehicle, and supporting the upper face 135 of the cylindrical body 130 in a generally horizontal orientation. The two bores 126 are spaced along a diagonal line relative to the upper face 135. Other details of the angle bracket base 120 are similar to those in the first example embodiment of FIGS. 1 and 2, including a central recess 140 extending down into a center of the upper face 135, with a series of holes 145 outboard of the central recess 140, as well as optionally a perimeter groove outboard of the holes 145 and centered upon the central recess 140, with the perimeter groove having a circular form. Left and right side angle bracket bases 120 can have an arc of such holes 145 regularly spaced to accommodate a light in various positions and orientations, which arcs can be mirror images for the left and right side bracket bases 120. FIG. 13 is a perspective view of a left side alternative embodiment angled bracket base 220 having a thicker flange than the angled bracket base 120.

With particular reference to FIGS. 1-5, details of the adapter plate 50 are described, according to a first example embodiment. The adapter plate 50 is a rigid monolithic structure, preferably formed from a common material as that from which the base 20 is formed. Alternatively, the adapter plate 50 could be formed of a different material than that from which the base 20 is formed. The adapter plate 50 includes a main body 55 with an ear 60 extending radially from a portion of the main body 55. The main body 55 is generally circular in form with a central bore 56 extending entirely through the main body 55 and perpendicular to planar upper and lower faces of the main body 55. A cylindrical extension 57 is aligned with the central bore 56 and extends from an underside of the main body 55 at a central portion thereof. This cylindrical extension 57 is cylindrical in form and has a diameter similar to a diameter (or width) of the central recess 40 in the upper face 35 of the cylindrical body 30 of the base 20 (or angled bracket base 120).

The adapter plate 50 includes a mount hole 62 within the ear 60. This mount hole 62 allows for a light, such as a spotlight, to be mounted to the ear 60 of the adapter plate 50. For instance, a fastener such as a bolt can pass through a hole in a bracket associated with the light, so that when the fastener is tightened, the light is securely attached to the ear 60 of the adapter plate 50 through the mount hole 62. Other forms of attachment of the light to the ear 60 of the adapter plate 50 could be provided. Alternatively, the light (or other item) could be mounted to other portions of the adapter plate 50, other than through the ear 60. The ear 60 preferably extends away from the main body 55 of the adapter plate 50 a sufficient distance so that the mount hole 62 is outboard of the side walls of the cylindrical body 30 of the base 20 when the adapter plate 50 has its cylindrical extension 57 nested within the central recess 40 of the base 20.

The adapter plate 50 also includes a set hole 58 passing through a portion of the main body 55. The set hole 58 is spaced away from the central bore 56 a distance similar to a spacing of the holes 36 away from the central recess 40 in the upper face 35 of the cylindrical body 30 of the base 20 (FIG. 1).

A set pin 70 (FIGS. 3 and 16) is mounted within the set hole 58. The set pin 70 has a central pin 90 associated therewith which is biased toward a lower position but can be moved upward by applying forces to the central pin 90 of the set pin 70. The central pin 90 includes a tip 96 at the lower portion thereof which is sized to fit within one of the holes 36 outboard of the central recess 40 in the upper face 35 of the cylindrical body 30 of the base 20 (or angle bracket base 120).

A spring 98 or other biasing structure can be located within the set pin 70, within a housing 80 thereof, pushing the tip 96 of the central pin downward (along arrow B of FIG. 3) unless the spring 98 is compressed by vertical forces applied to the central pin 90. One manner of supplying such forces vertically upward on the central pin includes pulling upward on a knob handle 100 (through a lateral shoulder at a tip thereof, as one option) or pulling upward on a ring handle 94 coupled to a shaft 92 or other upper portions of the central pin 90.

Figure 3:
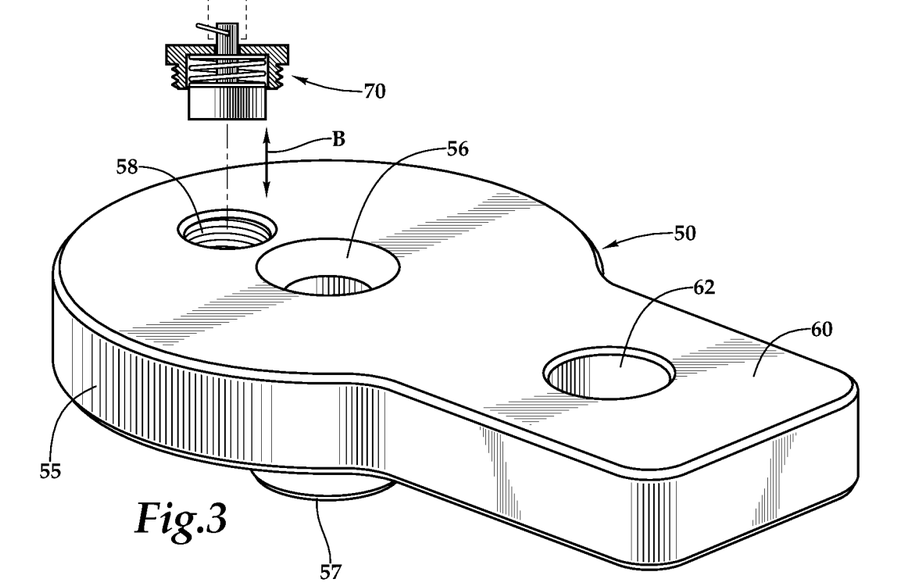
FIG. 3 is a perspective view from above of the adapter plate of the mounting system of FIGS. 1 and 2, and further including a set pin shown in side elevation and exploded out of a threaded set hole within the adapter plate, the set pin attachable to the adapter plate and manipulatable through a knob handle or ring handle to cause a tip of a central pin to move into and out of holes in an upper face of a cylindrical body of the base.
Figures 4, 5:
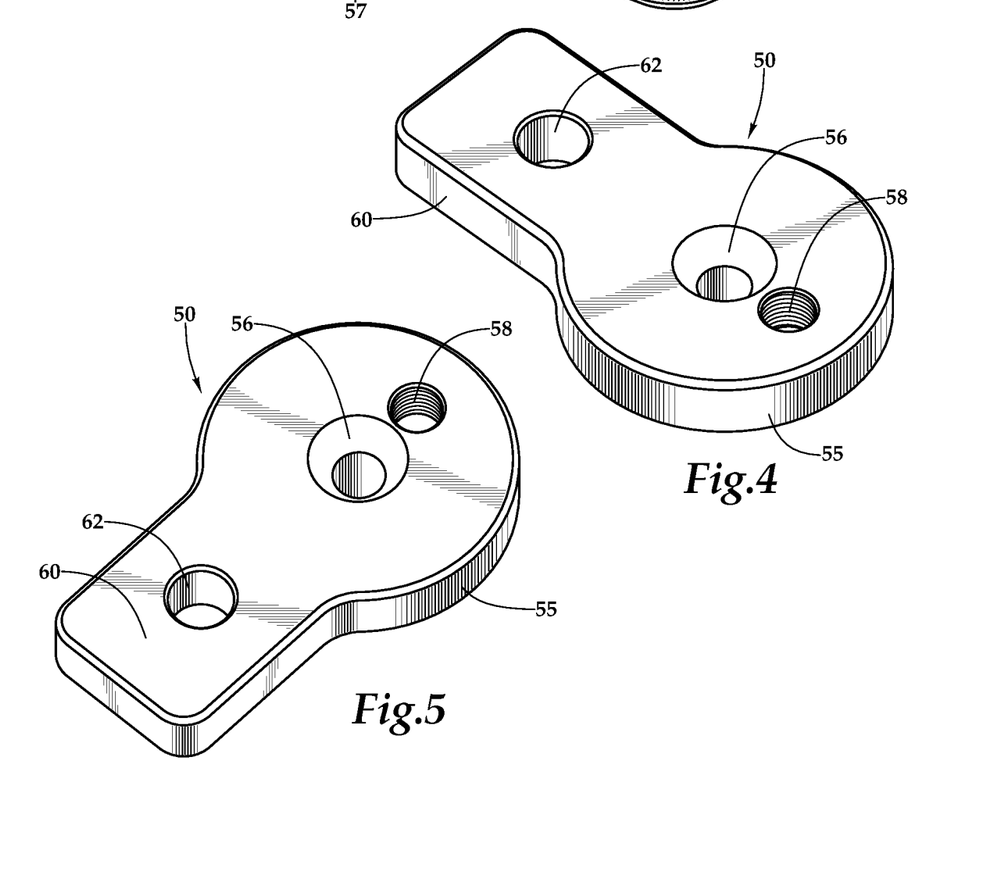
FIG. 4 is a perspective view from above of the adapter plate depicted in FIGS. 1-3.
FIG. 5 is a perspective view from above of the adapter plate depicted in FIGS. 1-4, and taken from a higher perspective than that depicted in FIG. 4.
Figure 6:
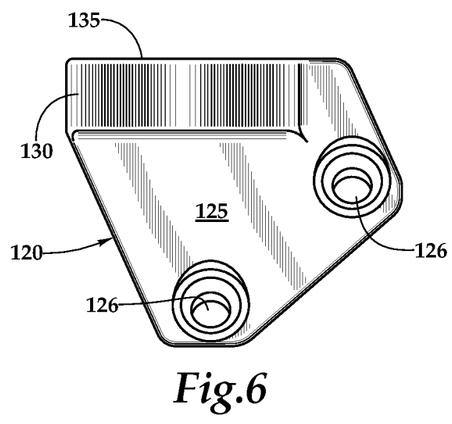
FIG. 6 is a front elevation view of an angled bracket base for use with the adapter plate of FIGS. 1-5, the angle bracket base providing an alternative embodiment to the base of FIGS. 1 and 2.
Figure 7:
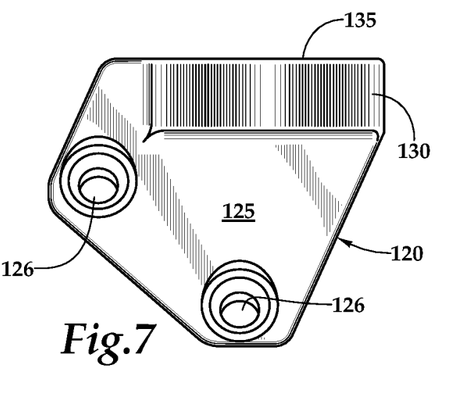
FIG. 7 is a front elevation view similar to that which is shown in FIG. 6, but depicting an angle bracket base particularly for use on a left side of a vehicle.
Figure 8:
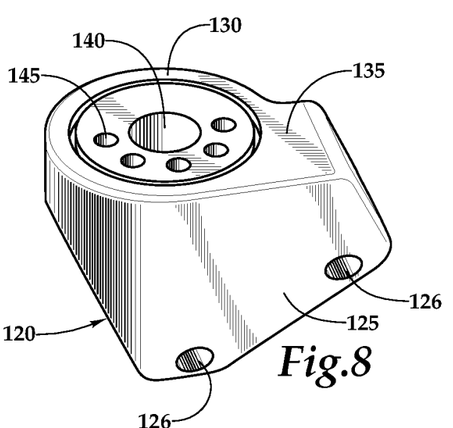
FIG. 8 is a perspective view from above and from the rear of that which is shown in FIG. 7.
Figure 9:
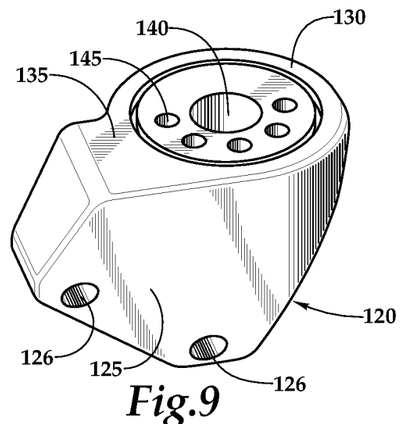
FIG. 9 is a perspective view from above and from the rear of that which is shown in FIG. 6.
Figure 10:
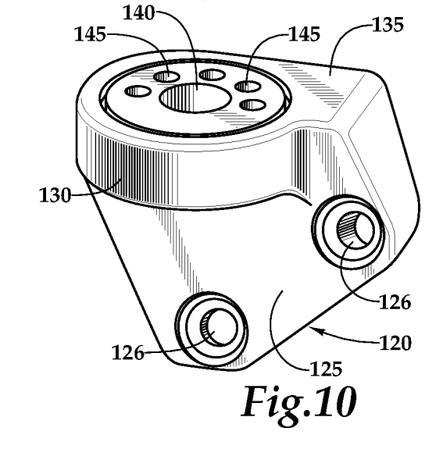
FIG. 10 is a perspective view from above of that which is shown in FIG. 6.
Figure 11:
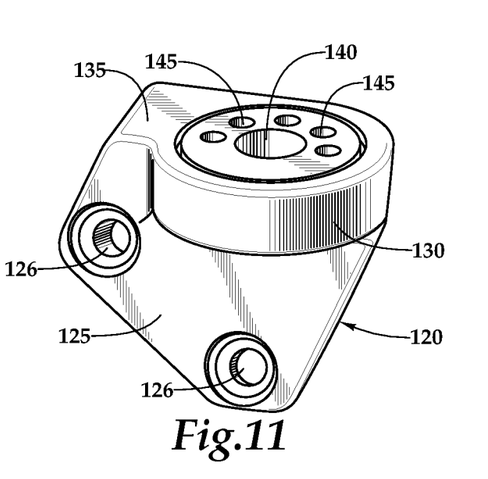
FIG. 11 is a perspective view from above of that which is shown in FIG. 7.

The housing 80 of the set pin 70 can include male threads 84 on an outer surface thereof which can interact with female threads in the set hole 58 within the main body 55 of the adapter plate 50. A faceted shoulder 82 of the housing 80, located above the male threads 84 on the housing 80 of the set pin 70, can allow for a torque applying tool, such as a wrench, to tighten the set pin 70 within this set hole 58 during an assembly step.

In use and operation, and with continuing reference to FIGS. 1-3 as well as FIGS. 13-19, details of the use and operation of the mounting system 10 are described, according to one disclosed embodiment. Initially, bores are formed if necessary within portions of the vehicle or other underlying structure, aligned with the bores 26 in the wings 25 or the flange 125 of the base 24 or angle bracket base 120. Appropriate fasteners then pass through these bores 26 to secure the base 20 (or angle bracket base 120) to the vehicle or other underlying structure.

A light or other item is mounted to the adapter plate 50, such as through the mount hole 62 in the ear 60, utilizing appropriate fasteners or other fastening systems to secure the light to the adapter plate 50. The adapter plate 50 resides with its cylindrical extension 57 located within the central recess 40 of the base 20. An axle bolt 45 passes through the central bore 56 of the adapter plate 50 and threads into a threaded bore in a floor of the central recess 40 of the cylindrical body 30, to keep the adapter plate 50 with its cylindrical extension 57 residing within the central recess 40, within the cylindrical body 30 of the base 20. Preferably, when this axle bolt 45 is tightened fully, sufficient vertical play remains between a head of the axle bolt 45 and adapter plate 50 so the adapter plate 50 can rotate freely (about arrow A of FIG. 2). Appropriate bearings can be provided to further facilitate such rotation if the axle bolt 45 is tight enough to otherwise generate excessive friction between the adapter plate 50 and the base 20.

Initially, the set pin 70 either has a tip 96 of a central pin 90 thereof residing within one of the holes 36 in the upper face 35 of the cylindrical body 30 of the base 20 (or angle bracket base 120) or the tip 96 of the central pin 90 of the set pin 70 is outside of these holes 36 and pressing against the upper face 35 between the holes 36. Rotation of the adapter plate 50 to cause the light or other item to be pointed/located where desired will result in the biased central pin 90 of the set pin 70 to snap into one of the holes 36 in the upper phase 35. If the light or other item is not oriented/positioned as desired, upward force is applied to the central pin 90 of the set pin 70, such as through the knob handle 100 or ring handle 94, to lift the tip 96 of the central pin 90 of the set pin 70 out of one of the holes 36 in the upper face 35. The adapter plate 50 can then be rotated to a desired orientation before releasing the knob handle 100 or ring handle 94 of the set pin 70 to allow the tip 96 of the central pin 90 to drop down into an appropriate hole 36 for appropriate location/orientation of the light or other item attached to the adapter plate 50. Should a new location/orientation be desired for items attached to the adapter plate 50, this process can be repeated for appropriate orientation of items attached to the vehicle or other structure through the mounting system 10 of this invention.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A mounting system for mounting of a spotlight or other item to a vehicle or other underlying support, the mounting system comprised in combination:
   a base having a rigid monolithic form including a cylindrical body with a flange extending downwardly from said cylindrical body;
   said flange including a plurality of bores passing therethrough;
   said cylindrical body having an upper face;

a central recess extending down into said upper face with a floor defining a lower extent of said central recess;

a plurality of holes extending downwardly into said upper face, outboard of said central recess;

an adapter plate formed of rigid unitary material, said adapter plate including a main body with an ear extending laterally therefrom;

said main body including a cylindrical extension sized to fit within said central recess in said cylindrical body of said base;

said adapter plate including a mount hole passing through said ear;

said main body including a central bore extending along a centerline thereof and through said cylindrical extension;

said main body including a set hole on a side of said central bore opposite said ear, said set hole including a set pin therein;

said set pin biased to extend downwardly from said set hole and into one of said holes in said upper face of said cylindrical body of said base; and a fastener oriented along a centerline of said cylindrical body, said fastener passing through said central recess and through said cylindrical extension, and securing said adapter plate to said base in a manner allowing rotation relative to said base with said cylindrical extension located within said central recess.

2. The mounting system of claim 1 wherein said base includes said flange extending within a plane that is closer to perpendicular to said upper face of said cylindrical body then parallel with said upper face of said cylindrical body.

3. The mounting system of claim 2 wherein said plurality of bores comprises two mounting bores, wherein said flange includes said two mounting bores passing therethrough, said two bores spaced from each other along a line diagonal relative to said upper face.

4. The mounting system of claim 3 wherein said underlying support is a motor vehicle.

5. The mounting system of claim 4 wherein said mount hole of said adapter plate is configured to have a light attached thereto.

6. The mounting system of claim 1 wherein said set pin is spring biased.

7. The mounting system of claim 6 wherein said set pin includes a knob handle on an upper portion thereof.

8. The mounting system of claim 6 wherein said set pin includes a ring handle on an upper portion thereof.

9. The mounting system of claim 1 wherein a perimeter groove is formed in said upper face of said cylindrical body; and wherein said perimeter groove is located outboard of said plurality of holes.

10. The mounting system of claim 9 wherein said perimeter groove is circular in form and extends down into said cylindrical body perpendicular to said upper face.

11. A mounting system for mounting of a spotlight or other item to a vehicle or other underlying support, the mounting system comprised in combination:

a base having a rigid monolithic form including a cylindrical body with an interconnect on said cylindrical body;

said cylindrical body having an upper face;

a central recess extending down into said upper face with a floor defining a lower extent of said central recess;

a plurality of holes extending downwardly into said upper face, outboard of said central recess;

an adapter plate formed of rigid unitary material, said adapter plate including a main body with an ear extending laterally therefrom;

said main body including a cylindrical extension sized to fit within said central recess in said cylindrical body of said base;

said adapter plate including a mount hole passing through said ear;

said main body including a central bore extending along a centerline thereof and through said cylindrical extension;

said main body including a set hole on a side of said central bore opposite said ear, said set hole including a set pin therein;

said set pin biased to extend downwardly from said set hole and into one of said holes in said upper face of said cylindrical body of said base; and a fastener oriented along a centerline of said cylindrical body, said fastener passing through said central recess and through said cylindrical extension, and securing said adapter plate to said base in a manner allowing rotation relative to said base with said cylindrical extension located within said central recess.

12. The mounting system of claim 11 wherein said interconnect is adapted to attach to a motor vehicle.

13. The mounting system of claim 11 wherein said mount hole of said adapter plate is configured to have a light attached thereto.

14. The mounting system of claim 11 wherein said set pin is spring biased.

15. The mounting system of claim 14 wherein said set pin includes a knob handle on an upper portion thereof.

16. The mounting system of claim 14 wherein said set pin includes a ring handle on an upper portion thereof.

17. The mounting system of claim 11 wherein a perimeter groove is formed in said upper face of said cylindrical body; and wherein said perimeter groove is located outboard of said plurality of holes.

18. The mounting system of claim 17 wherein said perimeter groove is circular in form and extends down into said cylindrical body perpendicular to said upper face.

* * * * *